United States Patent
Mandiganal et al.

(10) Patent No.: US 9,380,638 B2
(45) Date of Patent: Jun. 28, 2016

(54) HIERARCHICAL TREE NETWORK USING TDMA PROTOCOL WITH 802.11 INFRASTRUCTURE NODES FOR FIRE DETECTION SYSTEMS AND OTHER SYSTEMS

(71) Applicant: Honeywell International Inc., Morristown, NJ (US)

(72) Inventors: Santosh M. Mandiganal, Hubli (IN); Patrick S. Gonia, Maplewood, MN (US); Steve D. Huseth, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 143 days.

(21) Appl. No.: 13/826,709

(22) Filed: Mar. 14, 2013

(65) Prior Publication Data
US 2014/0269348 A1    Sep. 18, 2014

(51) Int. Cl.
*H04W 84/18*    (2009.01)
*H04B 7/212*    (2006.01)
*H04W 40/06*    (2009.01)
*H04W 76/00*    (2009.01)
*H04L 12/753*    (2013.01)
*H04W 40/00*    (2009.01)

(52) U.S. Cl.
CPC ............... *H04W 84/18* (2013.01); *H04B 7/212* (2013.01); *H04L 45/48* (2013.01); *H04W 40/06* (2013.01); *H04W 76/007* (2013.01); *H04W 40/005* (2013.01)

(58) Field of Classification Search
None
See application file for complete search history.

(56) References Cited

U.S. PATENT DOCUMENTS

| | | | |
|---|---|---|---|
| 4,679,189 A | 7/1987 | Olson et al. | |
| 5,898,826 A | 4/1999 | Pierce et al. | |
| 7,031,308 B2 | 4/2006 | Garcia-Luna-Aceves et al. | |
| 7,035,240 B1 | 4/2006 | Balakrishnan et al. | |
| 7,035,937 B2 | 4/2006 | Haas et al. | |

(Continued)

FOREIGN PATENT DOCUMENTS

| | | |
|---|---|---|
| EP | 1789936 | 12/2009 |
| EP | 2331886 | 6/2011 |
| WO | WO 2012/168262 A1 | 12/2012 |

OTHER PUBLICATIONS

Dr. Soumitri Kolavennu, Presentation, "WNSIA MAC Layer", ISA SP100 meeting, Feb. 14, 2007, 24 pages.

(Continued)

*Primary Examiner* — Christopher Crutchfield
*Assistant Examiner* — Alan Lindenbaum
(74) *Attorney, Agent, or Firm* — Schwegman Lundberg & Woessner, P.A.

(57) ABSTRACT

A system includes multiple nodes, where each node includes one or more 802.11 wireless radios. The nodes are arranged in a hierarchical tree structure in which one or more nodes residing in one level of the tree structure are configured to communicate with one or more nodes residing in another level of the tree structure to propagate information in the tree structure. At least a first of the nodes is configured to operate its associated radio(s) in an 802.11 access point mode and in an 802.11 station mode. The first node is configured to relay data to and from one or more nodes in a lower level of the tree structure using the 802.11 access point mode. The first node is further configured to transmit data to and receive data from one or more nodes in a higher level of the tree structure using the 802.11 station mode.

7 Claims, 5 Drawing Sheets

(56) References Cited

U.S. PATENT DOCUMENTS

| | | |
|---|---|---|
| 7,203,743 B2 | 4/2007 | Shah-Heydari |
| 7,620,409 B2 | 11/2009 | Budampati et al. |
| 7,688,802 B2 | 3/2010 | Gonia et al. |
| 7,742,394 B2 | 6/2010 | Budampati et al. |
| 7,881,253 B2 | 2/2011 | Budampati et al. |
| 7,933,240 B2 | 4/2011 | Budampati et al. |
| 8,189,494 B2 | 5/2012 | Budampati et al. |
| 8,264,956 B2 | 9/2012 | Ramankutty et al. |
| 2002/0072329 A1 | 6/2002 | Bandeira et al. |
| 2002/0176396 A1 | 11/2002 | Hammel et al. |
| 2004/0136318 A1 | 7/2004 | Bentley |
| 2004/0174829 A1 | 9/2004 | Ayyagari |
| 2004/0259533 A1 | 12/2004 | Nixon et al. |
| 2005/0281215 A1 | 12/2005 | Budampati et al. |
| 2006/0039347 A1 | 2/2006 | Nakamura et al. |
| 2006/0104301 A1 | 5/2006 | Beyer et al. |
| 2006/0128349 A1 | 6/2006 | Yoon |
| 2006/0274644 A1 | 12/2006 | Budampati et al. |
| 2006/0274671 A1 | 12/2006 | Budampati et al. |
| 2008/0010304 A1 | 1/2008 | Vempala et al. |
| 2008/0043637 A1 | 2/2008 | Rahman |
| 2008/0151801 A1 | 6/2008 | Mizuta |
| 2008/0267259 A1 | 10/2008 | Budampati et al. |
| 2008/0273547 A1 | 11/2008 | Phinney |
| 2008/0291881 A1 | 11/2008 | Vranken et al. |
| 2009/0022121 A1* | 1/2009 | Budampati et al. ........... 370/338 |
| 2009/0034441 A1 | 2/2009 | Budampati et al. |
| 2009/0109889 A1 | 4/2009 | Budampati et al. |
| 2009/0147702 A1 | 6/2009 | Buddhikot et al. |
| 2009/0181623 A1 | 7/2009 | Twitchell, Jr. |
| 2010/0177684 A1 | 7/2010 | Kore et al. |
| 2011/0299421 A1 | 12/2011 | Werb et al. |
| 2012/0163349 A1* | 6/2012 | Fontaine et al. ............... 370/336 |
| 2013/0235814 A1* | 9/2013 | Wietfeldt et al. ............. 370/329 |

OTHER PUBLICATIONS

Ying Zhang et al., "A Learning-based Adaptive Routing Tree for Wireless Sensor Networks", Journal of Communications, vol. 1, No. 2, May 2006, 10 pages.

Yau-Ming Sun, et al., "An Efficient Deadlock-Free Tree-Based Routing Algorithm for Irregular Wormhole-Routed Networks Based on the Turn Model", Proceedings of the 2004 International Conference on Parallel Processing (ICPP'04), 10 pages.

Sejun Song, "Fault Recovery Port-based Fast Spanning Tree Algorithm (FRP-FAST) for the Fault Tolerant Ethernet on the Arbitrary Switched Network Topology", 2001 IEEE, p. 325-332.

Manmath Narayan Sahoo, et al., "A Redundant Neighborhood Approach to Tolerate Access Point Failure in IEEE 802.11 WLAN", Fourth International Conference on Industrial & Information Systems, Dec. 28-31, 2009, Faculty of Engineering University of Peradeniya, Sri Lanka, 6 pages.

European Search Report dated Jun. 24, 2014 in connection with European Patent Application No. 14158218.9, 3 pages.

European Office Action dated Aug. 11, 2014 in connection with European Patent Application No. 14158218.9, 7 pages.

Cisco Systems et al.; "Cisco IOS Software Configuration Guide for Cisco Aironet Access Points"; XP002424858; Chapter 19; Internet citation; Apr. 2004; 12 pages.

\* cited by examiner

HIERARCHICAL TREE NETWORK USING TDMA PROTOCOL WITH 802.11 INFRASTRUCTURE NODES FOR FIRE DETECTION SYSTEMS AND OTHER SYSTEMS

TECHNICAL FIELD

This disclosure relates generally to monitoring and alarm systems. More specifically, this disclosure relates to a hierarchical tree network using a time division multiple access (TDMA) protocol with IEEE 802.11 infrastructure nodes for fire detection systems and other systems.

BACKGROUND

Fire detection systems and other monitoring and alarm systems routinely include a large number of monitoring nodes distributed in a building or other space. The monitoring nodes monitor their surrounding environment and trigger an alarm when a specified condition is detected.

In some systems, monitoring nodes communicate wirelessly with each other and with a centralized monitoring and alarm station. Conventional monitoring and alarm systems that support wireless communications often use battery-operated monitoring nodes with narrowband radios. These monitoring nodes can form a wireless mesh network, which allows the monitoring nodes to monitor a large area.

Unfortunately, monitoring nodes implemented in this manner typically support lower data rate protocols that suffer from bandwidth limitations, which result in reduced network capacity and increased detection and activation latency. Mesh networks implemented using these types of monitoring nodes also typically cannot support higher data rate applications, such as voice or video transport. Moreover, many mesh communication protocols do not implement or support any standard IEEE 802.11 security protocols and require overhead to support the use of routing protocols. In addition, it is typically difficult to implement and manage time synchronization across monitoring nodes and to manage time slot-based communications in a large mesh network, and the mesh network is often more susceptible to interference. These factors negatively impact the stability of the network.

SUMMARY

This disclosure provides a hierarchical tree network using a time division multiple access (TDMA) protocol with IEEE 802.11 infrastructure nodes for fire detection systems and other systems.

In a first embodiment, a system includes multiple nodes, where each node includes one or more 802.11 wireless radios configured to transmit and receive wireless signals. The nodes are arranged in a hierarchical tree structure in which one or more nodes residing in one level of the tree structure are configured to communicate with one or more nodes residing in another level of the tree structure to propagate information in the tree structure. At least a first of the nodes is configured to operate its associated one or more 802.11 wireless radios in an 802.11 access point mode and in an 802.11 station mode. The first node is configured to relay data to and from one or more nodes in a lower level of the tree structure using the 802.11 access point mode. The first node is further configured to transmit data to and receive data from one or more nodes in a higher level of the tree structure using the 802.11 station mode.

In a second embodiment, a node includes one or more 802.11 wireless radios configured to transmit and receive wireless signals in order to communicate with one or more other nodes residing in a higher level of a hierarchical tree structure and optionally with one or more other nodes residing in a lower level of the hierarchical tree structure. The node also includes a controller configured to control the one or more 802.11 wireless radios so that the one or more 802.11 wireless radios operate in an 802.11 access point mode and in an 802.11 station mode. The node is configured to relay data to and from the one or more other nodes in the lower level of the tree structure using the 802.11 access point mode. The node is configured to transmit data to and receive data from the one or more other nodes in the higher level of the tree structure using the 802.11 station mode.

In a third embodiment, a method includes monitoring at least one environmental condition at a first node in a monitoring and alarm system. The method also includes, using one or more 802.11 wireless radios, communicating with one or more other nodes residing in a higher level of a hierarchical tree structure in the monitoring and alarm system and optionally with one or more other nodes residing in a lower level of the hierarchical tree structure in the monitoring and alarm system. The first node is configured to relay data to and from the one or more other nodes in the lower level of the tree structure using the 802.11 access point mode. The first node is further configured to transmit data to and receive data from the one or more other nodes in the higher level of the tree structure using the 802.11 station mode.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
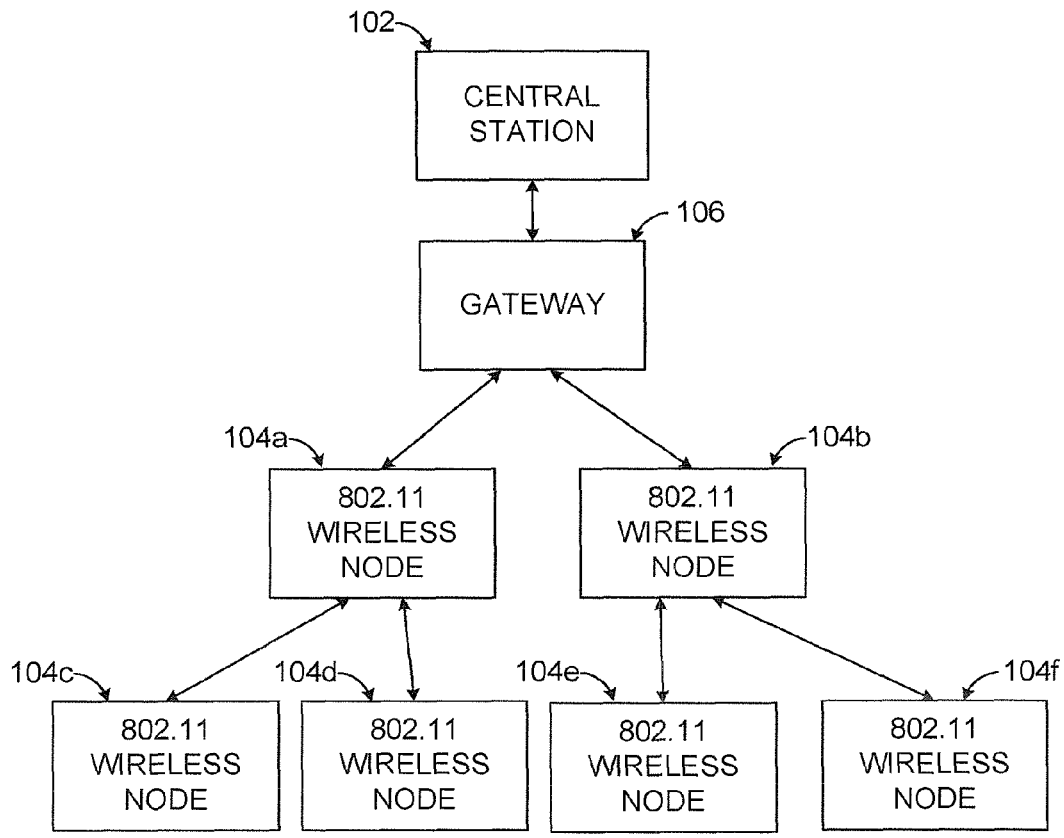
FIG. 1 illustrates an example monitoring and alarm system in accordance with this disclosure.

FIG. 1 illustrates an example monitoring and alarm system 100 in accordance with this disclosure. As shown in FIG. 1, the system 100 includes a central station 102, multiple IEEE 802.11 wireless nodes 104a-104f, and a gateway 106. The central station 102 supports centralized monitoring of a given area or areas based on data from the wireless nodes 104a-104f. The central station 102 also generates or presents alarms to notify personnel of one or more conditions detected by the wireless nodes 104a-104f. The central station 102 includes any suitable structure supporting monitoring or alarming operations. For example, the central station 102 could include one or more displays for presenting information to one or more users, such as information identifying data from the wireless nodes 104a-104f and any detected conditions or alarms.

Each wireless node 104a-104f represents a monitoring node having detection or monitoring components allowing the node to monitor its surrounding environment and detect one or more specified conditions. The specified conditions could include the presence of smoke, heat, fire, carbon monoxide, movement, or intruders. The wireless nodes 104a-104f are also able to transmit and receive wireless signals using wireless radios that support one or more IEEE 802.11 protocols. Each wireless node 104a-104f could further support additional functions depending on the implementation. For instance, a wireless node 104a-104f could support the routing of data between a source and a destination, such as from the central station 102 to another wireless node (or vice versa).

Each wireless node 104a-104f includes any suitable structure for detecting one or more conditions. Each wireless node 104a-104f also includes one or more IEEE 802.11 wireless radios.

The gateway 106 supports the exchange of data between the central station 102 and the wireless nodes 104a-104f. For example, the gateway 106 could be coupled to the central station 102 using a wired connection, and the gateway 106 could convert wireless-formatted data from the wireless nodes 104a-104f into wired-formatted data for the central station 102 (or vice versa). The gateway 106 could also support the exchange of data between wireless nodes 104a-104f. The gateway 106 includes any suitable structure facilitating communication between different components using different protocols. Note, however, that the use of the gateway 106 is optional. For instance, the central station 102 could include at least one wireless radio, allowing the central station 102 to communicate directly with one or more of the wireless nodes 104a-104f.

In general, IEEE 802.11 protocols allow wireless radios to operate in an infrastructure mode, where each wireless radio can function as one of an access point or a station (or possibly both at the same time). An access point in the IEEE 802.11 protocols generally represents a device that receives and routes data from one or more stations. A station in the IEEE 802.11 protocols generally represents a device that communicates with other devices via an access point.

Unfortunately, one IEEE 802.11 infrastructure network typically cannot be used in large fire detection systems or other monitoring and alarm systems. A single infrastructure network typically cannot scale adequately to handle a large number of monitoring nodes and cannot cover an adequate range for a monitoring and alarm system. If an attempt is made to use one infrastructure network in a larger monitoring and alarm system, the range between some stations and an access point is typically too great for reliable communications, and the overall network is more susceptible to interference.

In accordance with this disclosure, various wireless components in the system 100 support the use of IEEE 802.11 wireless radios in infrastructure mode, and these components are arranged in a hierarchical tree configuration. That is, each wireless component in the system 100 (except the top node) communicates with a parent node, and each wireless component in the system 100 can communicate with one or more child nodes. The head of the tree is typically the central station 102 or the gateway 106. Some of the wireless nodes 104a-104b communicate directly with the central station 102 or gateway 106, and those wireless nodes 104a-104b are children to the parent central station 102 or gateway 106. Those wireless nodes 104a-104b are also parents of the wireless nodes 104c-104f, which are children of the wireless nodes 104a-104b and communicate indirectly with the central station 102 or gateway 106 through their parent nodes. While shown here as having three levels in a tree, the hierarchical tree network could include any number of levels.

As can be seen here, various components have dual "personas." For example, the wireless nodes 104a-104b operate both as parent nodes to some components (the wireless nodes 104c-104f) and as child nodes to other components (the central station 102 or gateway 106). Various approaches are described below for supporting the use of dual personas in a single IEEE 802.11 wireless node. Moreover, as described below, a time division multiple access (TDMA) approach is provided for managing communications between the components in the system 100.

The use of standard IEEE 802.11 wireless radios in various components of FIG. 1 can provide several advantages. For example, IEEE 802.11 radios are typically less expensive than custom mesh network radios, and IEEE 802.11 radios can offer higher data rates and larger bandwidths. This allows the system 100 to support the creation of a wireless network with larger network capacities, which can support additional services like voice and video transport. Also, IEEE 802.11 radios are becoming more and more power efficient, reducing power consumption and prolonging the operational life of any internal power supplies in network components (assuming the network components are not line-powered). In addition, IEEE 802.11 radios support the creation of secured wireless networks based on standard IEEE 802.11 security protocols, support better interference handling, and increase the ease of implementing and maintaining network-level time synchronization. The overall result allows the system 100 to create a larger-capacity and longer-range wireless network using standard IEEE 802.11-based devices.

This functionality could be useful in any suitable monitoring or alarming system. Example systems include fire detection systems, gas sensor systems, and public announcement systems. Any other suitable system could incorporate this functionality.

Although FIG. 1 illustrates one example of a monitoring and alarm system 100, various changes may be made to FIG. 1. For example, the system 100 could include multiple central stations 102 or multiple gateways 106. The system 100 could also include any number of wireless monitoring nodes arranged in any suitable number of hierarchical levels in a tree. In addition, note that not every node in the wireless network of the system 100 needs to support dual personas. In FIG. 1, for instance, each of the wireless nodes 104c-104f could be implemented using a single persona (an IEEE 802.11 station), and the central station 102 or gateway 106 could be implemented using a single persona (an IEEE 802.11 access point).

Figure 2:
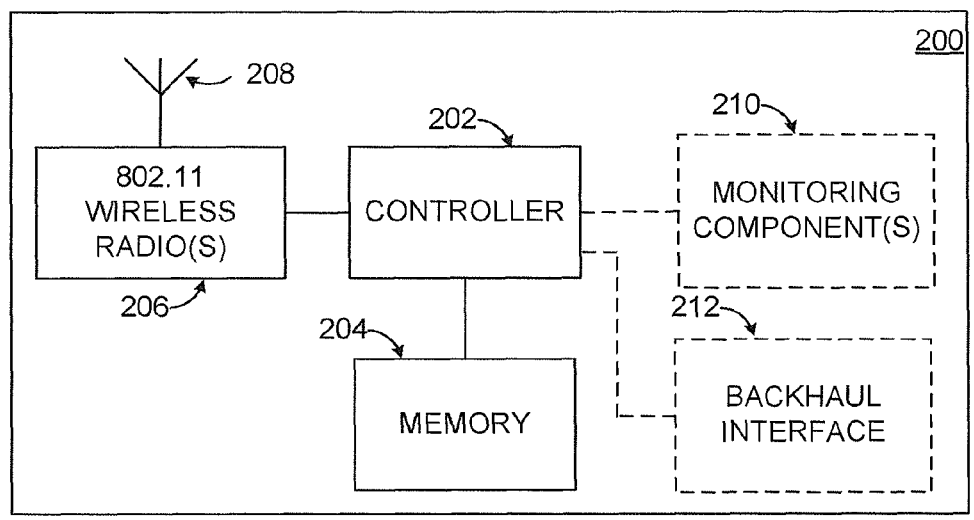
FIG. 2 illustrates an example wireless node in a monitoring and alarm system in accordance with this disclosure.

FIG. 2 illustrates an example wireless node 200 in a monitoring and alarm system in accordance with this disclosure. The wireless node 200 here could represent any of the wireless nodes 104a-104f in the system 100 of FIG. 1. The wireless node 200 could also represent the gateway 106 or part of the central station 102 in FIG. 1.

As shown in FIG. 2, the node 200 includes a controller 202, which controls the overall operation of the node 200. For example, the controller 202 may obtain or generate data to be transmitted, such as data based on one or more sensed environmental conditions. The controller 202 could also generate heartbeat signals or other signals used to indicate proper operation of the wireless node 200. The controller 202 could further receive data transmitted wirelessly, such as commands for altering the sensing performed by the wireless node 200. In addition, the controller 202 could control which persona or personas are currently being used by the wireless node 200. The controller 202 includes any suitable structure for controlling operation of a wireless node. As particular examples, the controller 202 could represent at least one microprocessor, microcontroller, field programmable gate array, application specific integrated circuit, or other processing or control device.

A memory 204 is coupled to the controller 202. The memory 204 stores data used, collected, or generated by the node 200. For example, the memory 204 could store information received at or to be transmitted from the wireless node 200. The information to be transmitted could originate at the wireless node 200 or be received from another device for relay towards an intended destination. The memory 204 includes any suitable volatile and/or non-volatile storage and retrieval device(s).

The node 200 also includes at least one IEEE 802.11 wireless radio 206 and at least one antenna 208. The wireless radio(s) 206 and antenna(s) 208 can be used to communicate wirelessly with other devices, such as the central station 102, wireless nodes 104a-104f, or gateway 106. Each wireless radio 206 includes any suitable structure for communicating using at least one IEEE 802.11 protocol. Each antenna 208 includes any suitable structure for transmitting and receiving wireless signals.

If the node 200 represents a monitoring device, the node 200 could include one or more monitoring components 210. The monitoring components 210 allow the node 200 to sense one or more environmental conditions around the node 200. For example, the monitoring components 210 could be used to detect smoke, heat, fire, one or more chemicals, movement, or other conditions near the node 200. The monitoring components 210 include any suitable structure(s) capable on monitoring or detecting one or more conditions.

If the node represents the gateway 106, the node 200 could further include a backhaul interface 212. The backhaul interface 212 allows the node 200 to communicate over a wired or wireless backhaul network, such as an Ethernet network. Among other things, this allows the gateway 106 to communicate data towards the central station 102. The backhaul interface 212 includes any suitable structure supporting communications over a backhaul link.

Although FIG. 2 illustrates one example of a wireless node 200 in a monitoring and alarm system, various changes may be made to FIG. 2. For example, various components in FIG. 2 could be combined, subdivided, or omitted and additional components could be added according to particular needs. Also, a "wireless node" represents any device that can transmit or receive data wirelessly, even if the "wireless node" also has the ability to transmit or receive data over a wired connection and/or has the ability to receive power over a wired connection.

Figure 3:
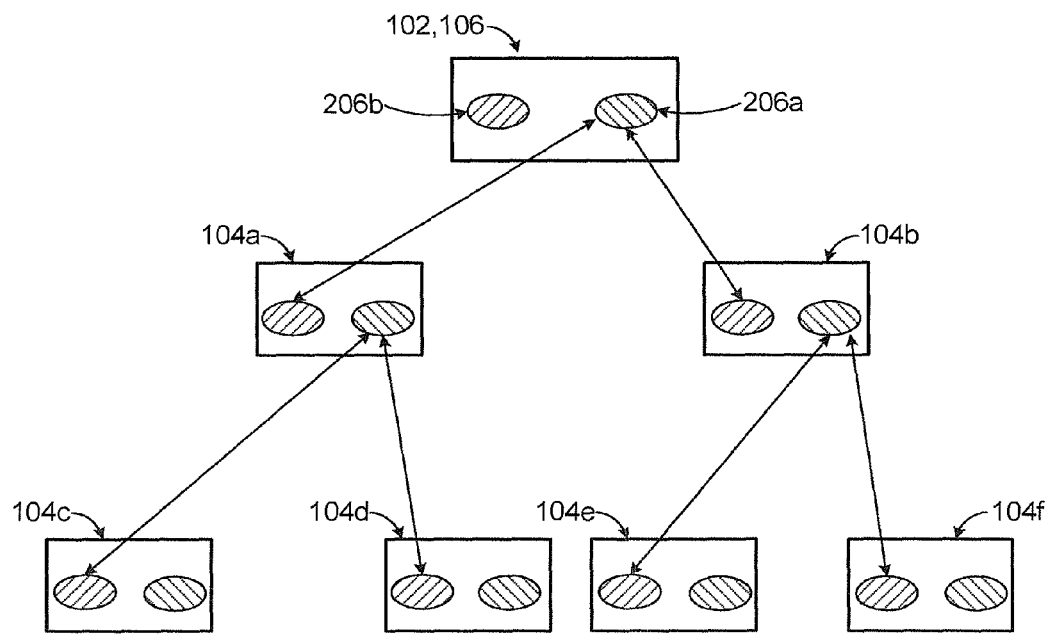
FIGS. 3 and 4 illustrate example techniques for forming a hierarchical tree network in a monitoring and alarm system in accordance with this disclosure.
Figure 4:
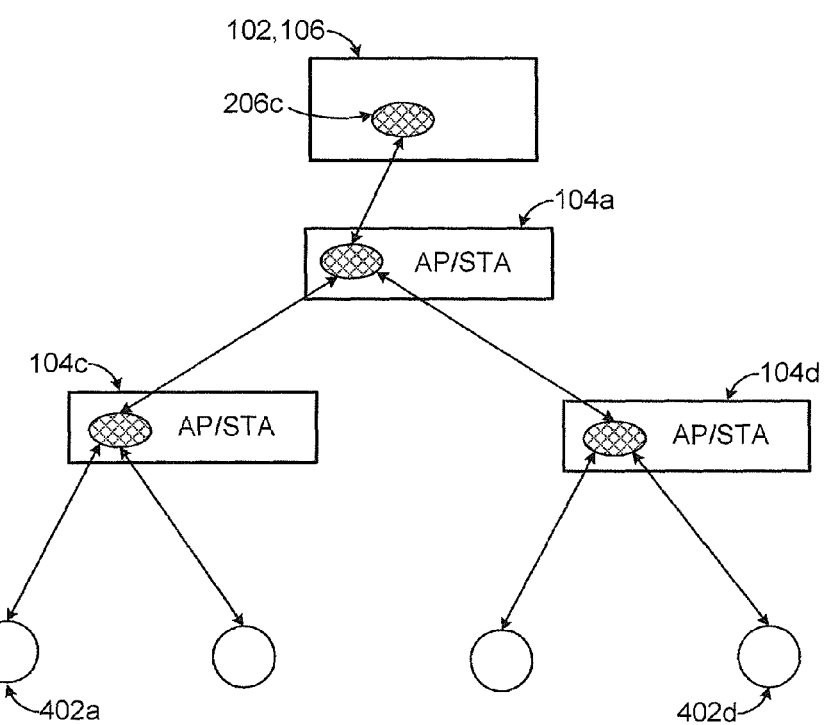

FIGS. 3 and 4 illustrate example techniques for forming a hierarchical tree network in a monitoring and alarm system in accordance with this disclosure. These techniques can be used to support multiple personas in one or more 802.11 wireless nodes of a hierarchical tree network. In particular, at least some nodes of the hierarchical tree network can operate in a "parent" persona and a "child" persona. Nodes that have multiple personas could support the simultaneous use of those personas or non-overlapping use of those personas.

In FIG. 3, each component 102-106 in the system 100 is shown as having multiple wireless radios 206a-206b. Each wireless radio 206a represents an IEEE 802.11 wireless radio operating as an 802.11 access point, and each wireless radio 206b represents an IEEE 802.11 wireless radio operating as an 802.11 station. Each wireless radio 206a operating as an 802.11 access point supports the "parent" persona, while each wireless radio 206b operating as an 802.11 station supports the "child" persona. As a result, each component 102-106 here includes multiple wireless radios and has the ability to function in multiple personas. Each component 102-106 has the parent persona when using the wireless radio 206a and the child persona when using the wireless radio 206b.

Each wireless radio 206a in FIG. 3 has the ability to create an IEEE 802.11 wireless infrastructure network. The wireless radios 206b in other nodes can then join that infrastructure network as child nodes (stations). In this arrangement, the devices are organized into the tree structure, and each wireless node 104a-104f transmits data to or receives data from the central station 102 or gateway 106 using the wireless radio 206a at each level above that wireless node. Also, in this arrangement, each wireless node 104a-104f (and possibly the gateway 106) that receives data using its wireless radio 206a can provide a backhaul link via its wireless radio 206b.

Here, each device with a wireless radio 206a can help to increase network capacity by creating an infrastructure network and allowing child nodes to join that infrastructure network. Among other things, this allows a single central station 102 or gateway 106 to cover a large deployment area. In some embodiments, different infrastructure networks can be placed on different IEEE 802.11 channels to reduce interference, thus making the overall network more stable.

As described below, requests, responses, and other communications in the system 100 can be performed on a time slot basis to support TDMA communications. In these types of embodiments, various nodes (such as those implementing monitoring devices) can become active for a specified time interval during selected time slots to receive or transmit data. In the absence of transmissions or receptions or after various tasks have been completed, the nodes can enter a sleep state to conserve power.

Note that different radios 206a-206b in different components 102-106 may be omitted or unused depending on the implementation. In FIG. 3, for example, the wireless nodes 104c-104f have wireless radios 206a that do not communicate with lower levels of nodes in the tree. In nodes that do not operate in the parent persona to communicate with child nodes, the wireless radios 206a could be omitted in those nodes. Similarly, the top node in the tree in FIG. 3 (the central station 102 or gateway 106) does not use the wireless radio 206b to communicate with a parent node. In nodes that do not operate in the child persona to communicate with a parent node, the wireless radios 206b could be omitted in those nodes In FIG. 4, each component 102-106 in the system 100 is shown as having a single wireless radio 206c. Each wireless radio 206c represents an IEEE 802.11 wireless radio.

In some embodiments, each wireless radio 206c supports different operating modes, including access point mode and station mode. Each wireless radio 206c could also periodically or otherwise switch between operating in access point mode and operating in station mode. When operating in access point mode, the wireless radio 206c assumes the parent persona, and the wireless radio 206c can create an infrastructure network and allow child nodes to join the infrastructure network. When operating in station mode, the wireless radio 206c assumes the child persona, and the wireless radio 206c joins an infrastructure network created by its parent node and provide a backhaul link towards the central station 102/gateway 106. This creates the tree hierarchy and allows child nodes to communicate with the central station 102 or gateway 106 through their parent nodes. Communications can occur using a time slot basis to support TDMA communications, and each wireless radio 206c could switch its persona/operating mode based on the time slots allocated to that wireless radio 206c for communication. If no communications are occurring, the wireless radios 206c can enter a sleep state.

In other embodiments, each wireless radio 206c supports Wi-Fi Direct, a feature where Wi-Fi devices can connect and communicate with one another without requiring an intermediate access point. To support this, each wireless radio 206c can operate in access point mode (with the parent persona) or station mode (with the child persona). When operating in access point mode, the wireless radio 206c can act as a parent for child nodes. When operating in station mode, the wireless radio 206c can act as a child to a parent node and provide a backhaul link towards the central station 102/gateway 106. Once again, communications can occur using a time slot basis to support TDMA communications, and each wireless radio 206c can switch its persona/operating mode (such as at specified time intervals) based on its allocated time slots. If no communications are occurring, the wireless radios 206c can enter a sleep state.

Note that in FIG. 4, not all devices may need or have the ability to operate using multiple personas. For example, the central station 102 or gateway 106 may only need to operate in the parent persona. As another example, a wireless monitoring node or other node that does not have any child nodes need not operate in the parent persona. An example of this is shown in FIG. 4, where additional nodes 402a-402d communicate with the wireless nodes 104c-104d. These additional nodes 402a-402d may only operate in the child persona.

Although FIGS. 3 and 4 illustrate examples of techniques for forming a hierarchical tree network in a monitoring and alarm system, various changes may be made to FIGS. 3 and 4. For example, as described above, not all wireless nodes in the system need to have the same arrangement of wireless radios. For instance, the additional nodes 402a-402d of FIG. 4 could be present in FIG. 3, and the additional nodes 402a-402d may include the wireless radios 206b but not the wireless radios 206a.

Figure 5:
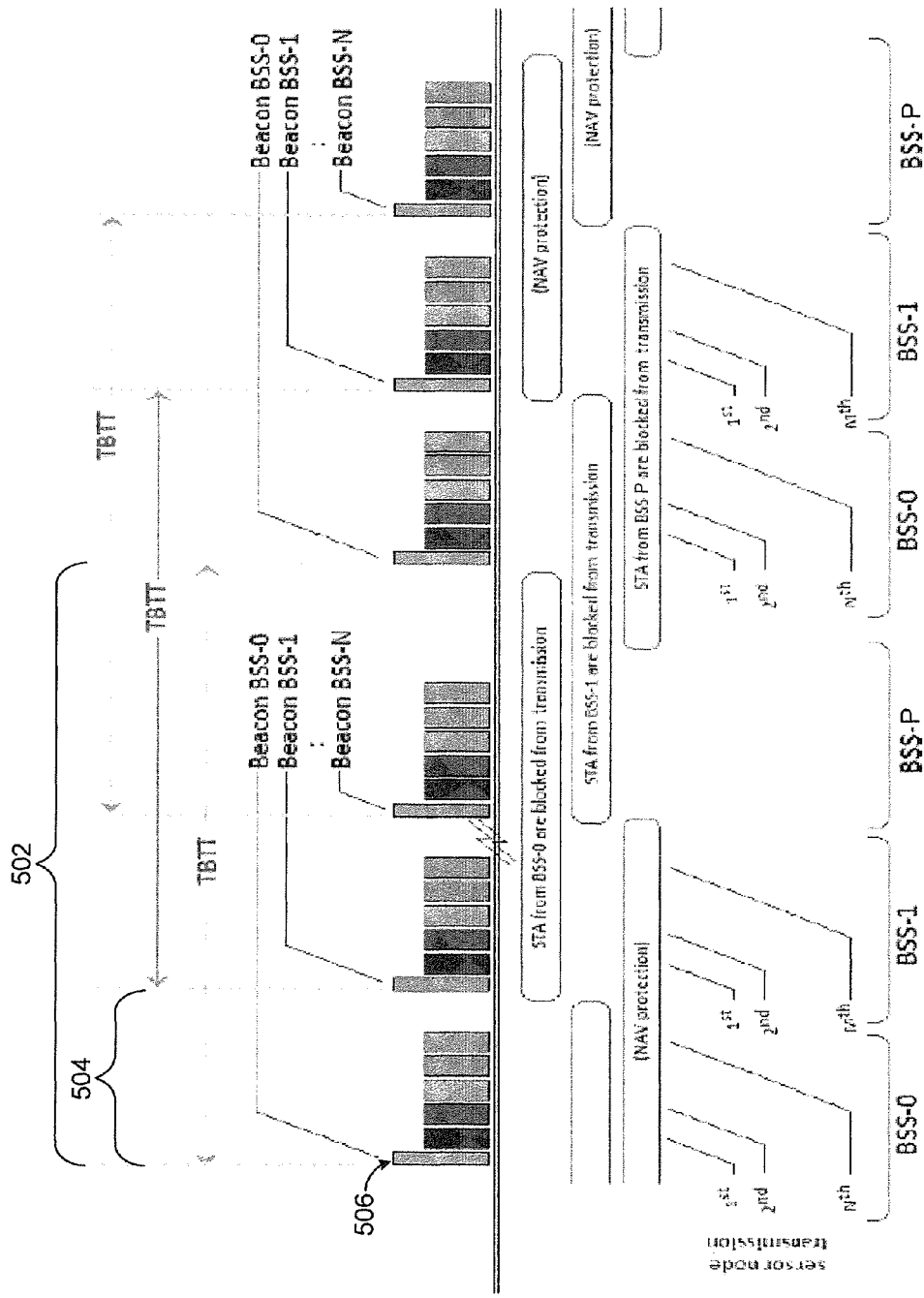
FIG. 5 illustrates an example time division multiple access (TDMA) protocol for a monitoring and alarm system in accordance with this disclosure.

FIG. 5 illustrates an example time division multiple access (TDMA) protocol for a monitoring and alarm system in accordance with this disclosure. As shown in FIG. 5, the TDMA protocol divides time into a repeating pattern of intervals 502, where each interval 502 has multiple sub-intervals 504. Each sub-interval 504 is associated with a different IEEE 802.11 basic service set (BSS). In the IEEE 802.11 protocols, a BSS represents a single access point and all stations communicating with that access point. In FIG. 1, for example, the gateway 106 and wireless nodes 104a-104b may form a first BSS, the wireless nodes 104a and 104c-104d may form a second BSS, and the wireless nodes 104b and 104e-104f may form a third BSS. Each BSS is allocated its own sub-interval 504 in each interval 502 of the TDMA protocol.

Within each sub-interval 504, there are multiple time slots 506 that are defined. Each time slot 506 represents a period of time during which communications can occur between an access point and one or more stations in a BSS. In this example, the first time slot 506 in each sub-interval 504 is reserved for the access point in the associated BSS to transmit a beacon signal. The remaining time slots 506 in each sub-interval 504 can be assigned to the stations in the BSS, and each station in the BSS can exchange data with the access point of the BSS during that station's allocated time slot 506.

In the TDMA protocol of FIG. 5, the stations in each BSS are allowed to transmit only during the sub-interval 504 assigned to that BSS. The stations in each BSS are blocked from transmitting signals during the sub-intervals 504 assigned to other BSSs.

In this example, N stations are associated with BSS-0, and M stations are associated with BSS-1. Also, there are P BSSs in the system. Each one of these variables M, and P could have any suitable value, and the values may or may not be equal. In some embodiments, each BSS may include a single access point and a maximum of three stations.

Overall, the TDMA protocol in FIG. 5 has the following features. The operation of multiple BSSs is time sliced, and each BSS is allocated a duration (sub-interval 504) during which its stations are allowed to transmit. The access point of each BSS can transmit a beacon at the beginning of its sub-interval 504, and all nodes in the BSS may remain awake for the entire sub-interval 504 allocated to that BSS. As a result, small BSSs could be used to reduce power consumption. In some embodiments, point coordinator function (PCF) inter-frame spacing (PIFS) may be used rather than distributed coordinator function (DCF) inter-frame spacing (DIFS). In PCF, an access point sends a "CF-Poll" packet to stations, which causes the stations to go to sleep at precise times. The PIFS interval is smaller than the DIFS interval, which can improve medium blocking and reduce power consumption.

In particular embodiments, the TDMA protocol in FIG. 5 can have the following parameters. $T_{DUR}$ represents the duration of time allocated to each BSS (the duration of a sub-interval 504), and P represents the total number of BSSs in the system. Also, TBTT represents the target beacon transmission time (beacon interval), and $T_T$ represents the typical transmit time of a wireless node. In particular embodiments, the TDMA protocol in FIG. 5 can also have the following features. The value of $P \times T_{DUR}$ is less than TBTT. Also, all stations in a BSS may collectively occupy time slots for less than $T_{DUR}$. Further, the beacon period of each BSS is uniformly equal to TBTT, and each BSS has a unique identifier (BSSID) but the same network parameters. Beacon transmissions across multiple BSSs are staggered by $T_{DUR}$, and the maximum number of wireless nodes in the system is less than $TBTT/T_T$. Finally, an access point in a BSS can block transmissions by its stations during sub-intervals 504 allocated to other BSSs by transmitting a "CF-Poll" packet at high priority at the PIFS interval for a duration equal to $TBTT-T_{DUR}$.

Although FIG. 5 illustrates one example of a TDMA protocol for a monitoring and alarm system, various changes may be made to FIG. 5. For example, a BSS could include a single station and therefore only two time slots. Also, other TDMA protocols could be used in the monitoring and alarm system of FIG. 1.

Figure 6:
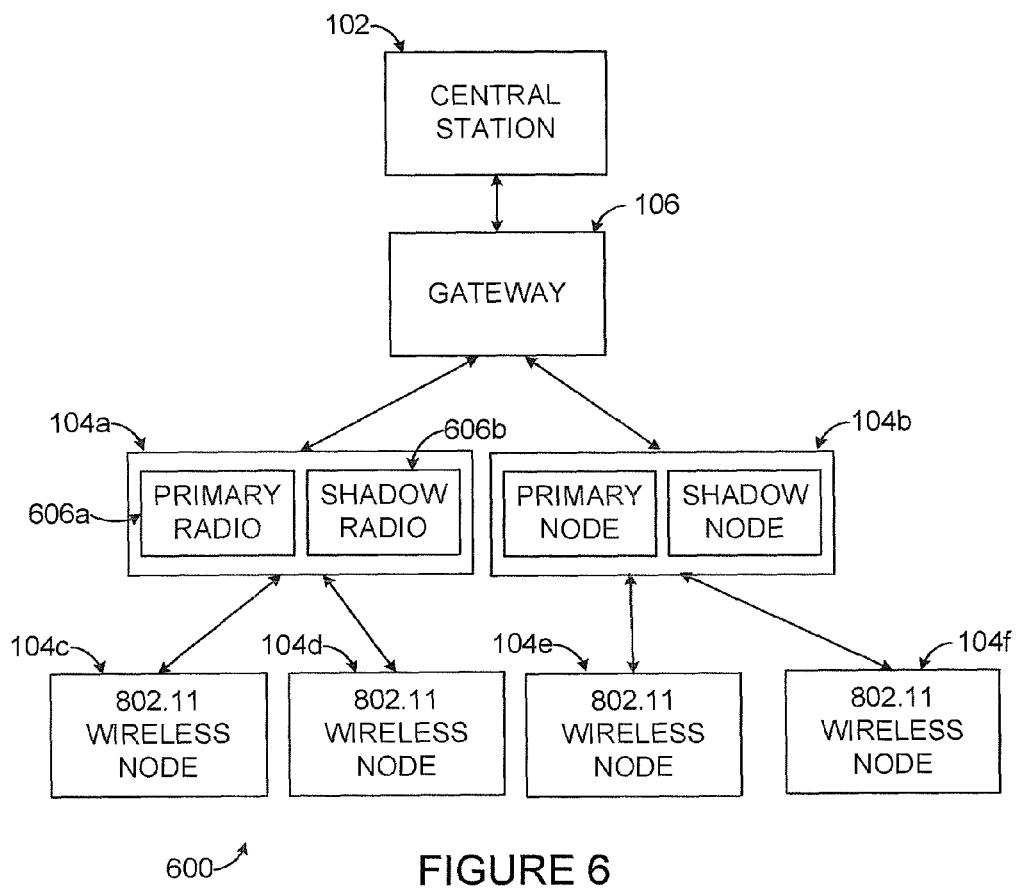
FIG. 6 illustrates another example monitoring and alarm system in accordance with this disclosure.

FIG. 6 illustrates another example monitoring and alarm system 600 in accordance with this disclosure. In this example, at least some of the components 102-106 in the system 600 can be implemented using a "primary" wireless radio 606a and a "shadow" wireless radio 606b. The primary wireless radio 606a can be responsible for transmitting wireless signals to and from child and parent nodes. The shadow wireless radio 606b can share network credentials, authentication credentials, and other information with the primary wireless radio 606a and listen to the transmissions made in its BSS. In this way, the shadow wireless radio 606b can assume primary operation if and when the wireless radio 606a fails.

Additional details regarding the use of multiple 802.11 wireless radios operating in primary and shadow modes are provided in U.S. patent application Ser. No. 13/826,342 titled "SHADOW ACCESS POINT FOR HIERARCHICAL TREE NETWORK USING 802.11 INFRASTRUCTURE NODES FOR FIRE DETECTION SYSTEMS AND OTHER SYSTEMS", which is hereby incorporated by reference.

Although FIG. 6 illustrates another example of a monitoring and alarm system 600, various changes may be made to FIG. 6. For example, the system 600 could include multiple central stations 102, multiple gateways 106, or any number of wireless nodes 104a-104f arranged in any suitable number of hierarchical levels in a tree. Also, not every node in the wireless network of the system 600 needs to include primary and shadow radios. This feature might be used, for instance, in nodes that are higher in the tree hierarchy.

Figure 7:
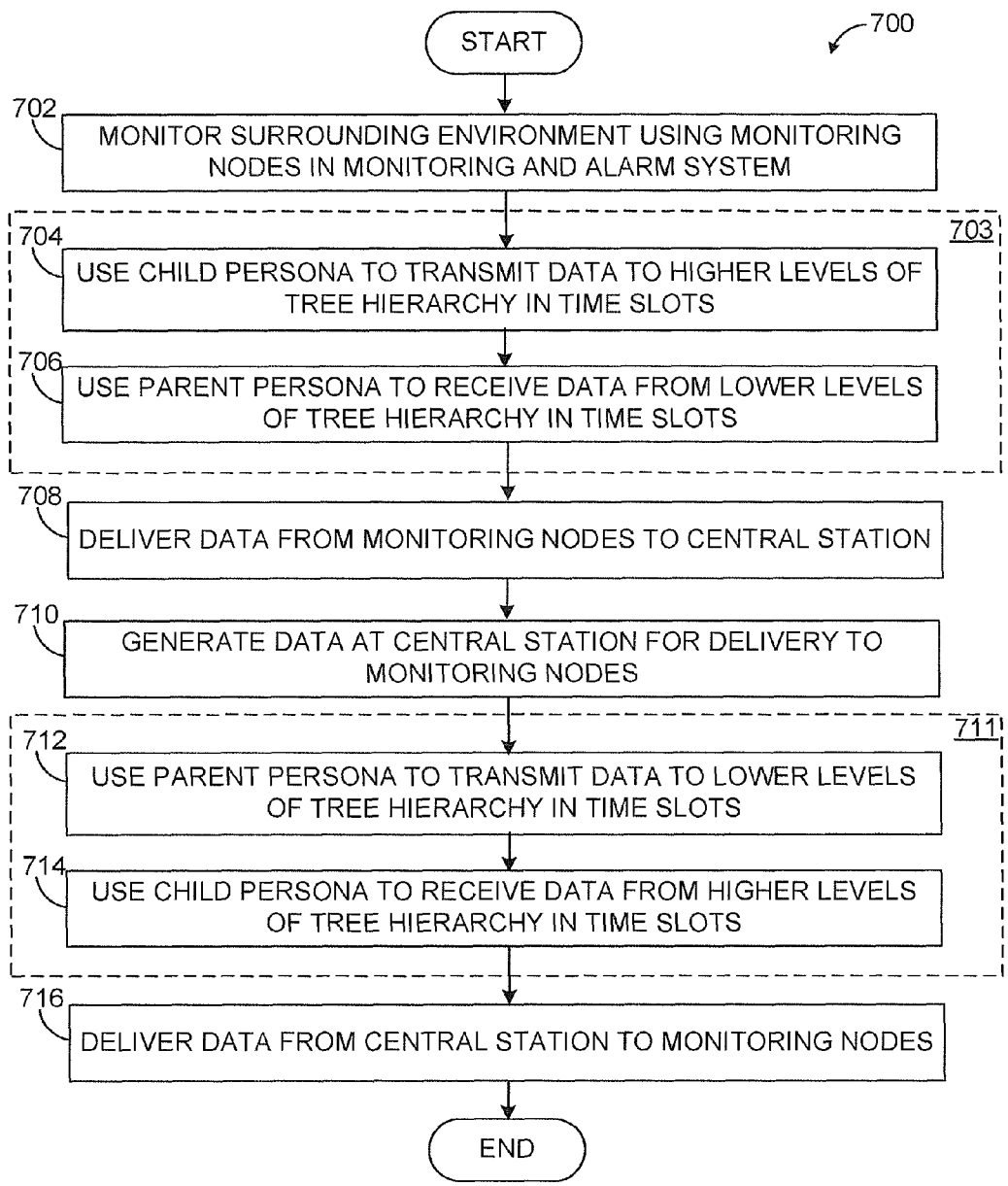
FIG. 7 illustrates an example method for operating a monitoring and alarm system with a TDMA protocol using IEEE 802.11 infrastructure nodes in accordance with this disclosure.

FIG. 7 illustrates an example method 700 for operating a monitoring and alarm system with a TDMA protocol using IEEE 802.11 infrastructure nodes in accordance with this disclosure. As shown in FIG. 7, monitoring nodes monitor their surrounding environment in a monitoring and alarm system at step 702. This could include, for example, various wireless nodes 104a-104f using the monitoring components 210 to sense smoke, heat, fire, carbon monoxide, movement, or intruders. Data from the monitoring nodes is transmitted towards a central station at step 703. This could include, for example, the various wireless nodes 104a-104f generating data based on the sensed environmental conditions. The transmission of data could include using a child persona to transmit the data to higher levels of a tree hierarchy at step 704 and using a parent persona to receive the data from lower levels of the tree hierarchy at step 706. This could include the various nodes 104a-104f using their 802.11 wireless radios 206 to support the different personas, where the data is generally received from child nodes and forwarded to parent nodes. The communications here occur in time slots, such as in those shown in FIG. 5. The data is eventually delivered to the central station at step 708. This could include providing the data directly to the central station 102 or indirectly to the central station 102 via the gateway 106. The data can be used by the central station 102 in any suitable manner.

The central station generates data for delivery to the monitoring nodes at step 710. This could include, for example, the central station 102 generating data for modifying the behavior of or requesting additional information from various wireless nodes 104a-104f. The data for the monitoring nodes is transmitted towards the monitoring nodes at step 711. The transmission of data could include using a parent persona to transmit the data to lower levels of the tree hierarchy at step 712 and using a child persona to receive the data from upper levels of the tree hierarchy at step 714. This could include the various nodes 104a-104f using their 802.11 wireless radios 206 to support the different personas, where the data is generally received from parent nodes and forwarded to child nodes. The communications here occur in time slots, such as in those shown in FIG. 5. The data is eventually delivered to the monitoring devices at step 716. The data can be used by the monitoring devices in any suitable manner.

Although FIG. 7 illustrates one example of a method 700 for operating a monitoring and alarm system with a TDMA protocol using IEEE 802.11 infrastructure nodes, various changes may be made to FIG. 7. For example, while shown as a series of steps, various steps in FIG. 7 could overlap, occur in parallel, occur in a different order, or occur any number of times. Also, various steps in FIG. 7 could be omitted, such as when communication in a monitoring and alarm system is one-way (like from the monitoring devices to the central station).

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
multiple nodes, each node comprising one or more 802.11 wireless radios configured to transmit and receive wireless signals;
the nodes distributed in a monitoring and alarm system and arranged in a hierarchical tree structure in which one or more nodes residing in one level of the tree structure are configured to communicate with one or more nodes residing in another level of the tree structure to propagate information in the tree structure to provide network coverage for all nodes in the monitoring and alarm system, the hierarchical tree structure including four or more levels of nodes, a first level including a gateway node, a second level including a first node, a third level including a second node, and a fourth level including a third node, the third node configured to communicate directly with the second node and configured to communicate indirectly with the first node through the second node, the second node configured to communicate directly with the first node, communicate directly with the third node, and configured to provide communications from the third node to the first node, the first node configured to communicate directly with the gateway node and the second node;

the second node of the nodes configured to operate a first wireless radio of the one or more 802.11 wireless radios in an 802.11 access point mode and a second radio of the one or more 802.11 wireless radios in an 802.11 station mode, the second node configured to relay data to and from one or more nodes in the third level of the tree structure using the first wireless radio, the second node further configured to transmit data to and receive data from one or more nodes in the first level of the tree structure using the second wireless radio, wherein the first node has only one 802.11 wireless radio configured to operate using the 802.11 access point mode and is configured to communicate with other 802.11 wireless radios in other nodes using Wi-Fi Direct, wherein in the access point mode the second node receives data from and routes data to the third node and allows the third node to join a basic service set (BSS) provided by the second node and in the station mode the second node communicates to other nodes through the first node and joins a BSS provided by the first node in access point mode, wherein the third node has only a single 802.11 wireless radio configured to operate using the 802.11 station mode.

2. The system of claim 1, wherein each of the nodes, when operating using the 802.11 access point mode, is configured to create a separate infrastructure network.

3. The system of claim 2, wherein the second node and the third node comprise monitoring nodes, each monitoring node configured to monitor one or more conditions in a surrounding environment.

4. The system of claim 3, wherein the first level of the tree structure further comprises:

a central station configured to monitor environmental conditions detected by the monitoring nodes and generate alarms.

5. The system of claim 4, wherein each of the first, second, and third nodes are configured to communicate using a time division multiple access (TDMA) protocol.

6. The system of claim 5, wherein:

the nodes form multiple 802.11 basic service sets (BSSs) one or more basic service set for each level below the first level, each BSS configured to communicate on different 802.11 channels; and the TDMA protocol comprises a repeating pattern of intervals, each interval comprising a sub-interval for each BSS, each sub-interval comprising multiple time slots for communications amongst devices in the associated BSS.

7. A method comprising:

monitoring, using multiple nodes in a monitoring and alarm system, at least one environmental condition each node of the multiple nodes comprising one or more 802.11 wireless radios configured to transmit and receive wireless signals, the multiple nodes arranged in a hierarchical tree structure in which one or more nodes residing in one level of the tree structure are configured to communicate with one or more nodes residing in another level of the tree structure to propagate information in the tree structure to provide network coverage for all nodes in the monitoring and alarm system, the hierarchical tree structure including four or more levels of nodes, a first level including a gateway node, a second level including a first node, a third level including a second node, and a fourth level including a third node, the third node configured to communicate directly with the second node and configured to communicate indirectly with the first node through the second node, the second node configured to communicate directly with the first node, communicate directly with the third node, and configured to provide communications from the third node to the first node, the first node configured to communicate directly with the gateway node and the second node;

relaying, using a first radio of the second node, data to and from one or more nodes in the third level of the tree structure, the first radio configured to operate in an 802.11 access point mode;

when the second node is in the access point mode, allowing the third node to join a basic service set (BSS) provided by the second node;

transmitting data to and receiving data from, using a second radio of the second node, one or more nodes in the first level of the tree structure, the second radio configured to operate in an 802.11 station mode;

when the second node is in the station mode, communicating, using the second radio of the second node, to other nodes through the first node and joining a BSS provided by the first node in access point mode, transmitting data to and receiving data from, using the second radio of the second node, one or more nodes in the first level of the tree structure;

communicating with other 802.11 wireless radios in other nodes using one 802.11 wireless radio of the first node using Wi-Fi Direct, wherein the first node has only one 802.11 wireless radio configured to operate using the 802.11 access point mode; and communicating to the first radio of the second node using the third node, wherein the third node has only a single 802.11 wireless radio configured to operate using the 802.11 station mode.

* * * * *